United States Patent [19]

Kelley et al.

[11] Patent Number: 4,702,439
[45] Date of Patent: Oct. 27, 1987

[54] SUPPORT FOR THERMALLY EXPANDING CONICAL HEATSHIELD

[75] Inventors: Anthony D. Kelley, Willow Glen; James W. Finley, Palo Alto; Vernon F. Eachus, San Jose; Richard A. Lim, Sunnyvale; Miles K. Yano, Gardena, all of Calif.

[73] Assignee: The United States of America as represented by the Secretary of the Navy, Washington, D.C.

[21] Appl. No.: 5,971

[22] Filed: Jan. 20, 1987

[51] Int. Cl.$^4$ ............................................. B64G 1/58
[52] U.S. Cl. ................................. 244/158 A; 244/131; 403/29; 403/30
[58] Field of Search .......... 244/158 A, 117 A, 117 R, 244/119, 123, 131; 29/156.8 B; 403/24, 30

[56] References Cited

U.S. PATENT DOCUMENTS

| | | | |
|---|---|---|---|
| 3,536,011 | 10/1970 | Kinnaird et al. | 244/117 A |
| 3,596,604 | 8/1971 | Corkery | 244/158 A |
| 3,745,928 | 7/1973 | Kinnaird et al. | 244/158 A |
| 4,031,806 | 6/1977 | Stark et al. | 244/158 A |
| 4,299,018 | 11/1981 | Bickerstaff et al. | 403/30 |
| 4,550,385 | 3/1987 | Jackson et al. | 403/29 |

*Primary Examiner*—Galen Barefoot
*Attorney, Agent, or Firm*—C. D. B. Curry; W. C. Daubenspeck

[57] ABSTRACT

The front end of a conical forward carbon-carbon heatshield is attached to. carbon-carbon nose tip by a threaded connection. The nose tip provides rigid structural support for the small end of the heatshield at all conditions of thermal expansion. The joint between the aft end of the forward heatshield and the forward end of an aft carbon-phenolic heatshield includes a tolerance gap which is tapered to accommodate the vector movement of the carbon-carbon heatshield due to axial and circumferential thermal expansion. The gap is filled with a high temperature insulating washer of frangible material which is crushed by the axial expansion of the forward heatshield and evacuated by the slip-stream. The forward heatshield is supported at the joint by a segmented ring of high density carbon wedges that will expand during flight and move with the heatshield along an expansion ramp to provide continuous support.

25 Claims, 3 Drawing Figures

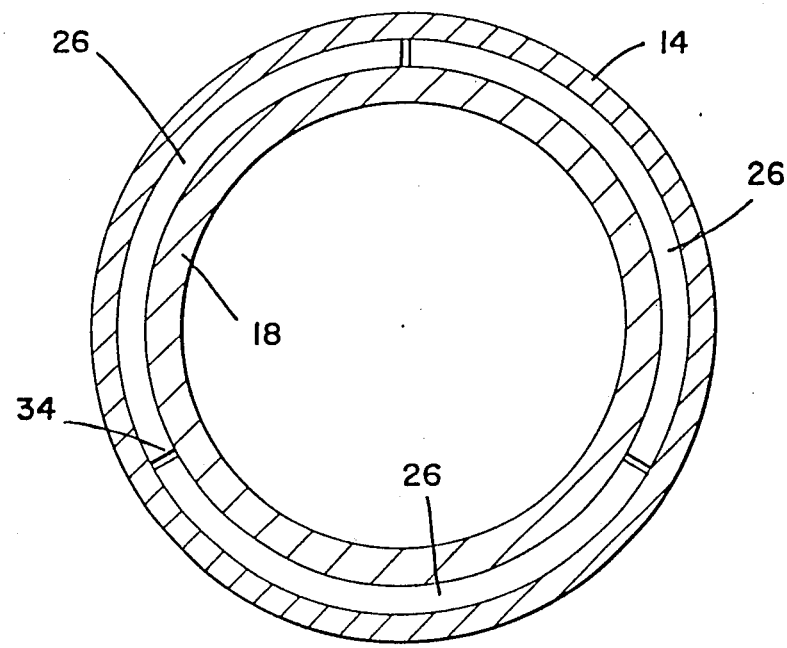
FIG _ 2
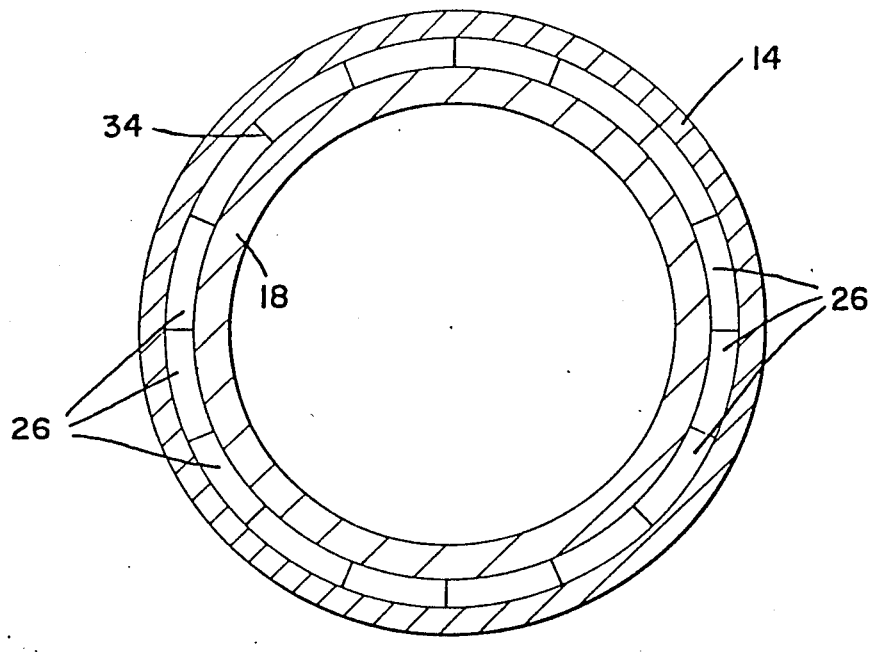
FIG _ 3

SUPPORT FOR THERMALLY EXPANDING CONICAL HEATSHIELD

BACKGROUND OF THE INVENTION

This invention relates in general to ballistic reentry bodies and, in particular, to a reentry body employing a forward heatshield of carbon-carbon composite material and an aft heatshield of carbon-phenolic material.

Advanced reentry bodies having higher ballistic coefficients have more stringent thermal and mechanical requirements. The current carbon-phenolic composite heatshields could become unacceptable because of an expected increase in sudden char loss causing a corresponding decrease in vehicle accuracy. Ground and flight testing have demonstrated the superiority of carbon-carbon composites for erosion and ablation resistance.

One solution is to replace the forward heatshield, which experiences the most severe thermal and aerodynamic conditions, with a heatshield of carbon-carbon material that will minimize char loss and maximize damping of angle-of-attack dispersions. The aft heatshield remains constructed of carbon-phenolic material. However, because the thermal expansion characteristics of carbon/carbon composites differ from the thermal expansion characteristics of carbon-phenolic composites and the forward heat shield experiences much greater heating, the method of attachment of the forward heatshield presents a special problem. In particular, the joint design between the forward carbon-carbon heatshield and the aft carbon-phenolic heat shield must allow free expansion of the carbon-carbon material while providing continuous support during flight.

SUMMARY OF THE INVENTION

It is therefore the primary object of the present invention to provide a means for supporting a carbon-carbon forward heatshield on a reentry body which allows free expansion of the carbon-carbon material while providing continuous support during the flight of the reentry body.

According to the present invention, the front end of the conical forward carbon-carbon heatshield is attached to the carbon-carbon nose tip by a threaded connection. The nose tip provides rigid structural support for the small end of the heatshield at all conditions of thermal expansion. The joint between the aft end of the forward heatshield and the forward end of the aft heatshield includes a tolerance gap which is tapered to accomodate the vector movement of the carbon-carbon heatshield due to axial and circumferential thermal expansion. The gap is filled with a high temperature insulating washer of frangible material which is crushed and evacuated by the axial expansion of the forward heatshield. The forward heatshield is supported at the joint by a segmented ring of high density carbon wedges that will expand during flight and move with the heatshield along an expansion ramp to provide continuous support.

Other objects and many of the attendant advantages will be readily appreciated as the present invention becomes better understood by reference to the following detailed description when considered in conjunction with the accompanying drawings wherein:

BRIEF DESCRIPTION OF THE DRAWINGS

FIG. 2 is a cross-sectional view taken along line 2—2 in FIG. 1 illustrating one embodiment of the segmented ring of sliding wedge blocks; and FIG. 3 is a cross-sectional view taken along line 2—2 in FIG. 1 illustrating a second embodiment of the segmented ring of sliding wedge blocks.

DESCRIPTION OF THE PREFERRED EMBODIMENT

Figure 1:
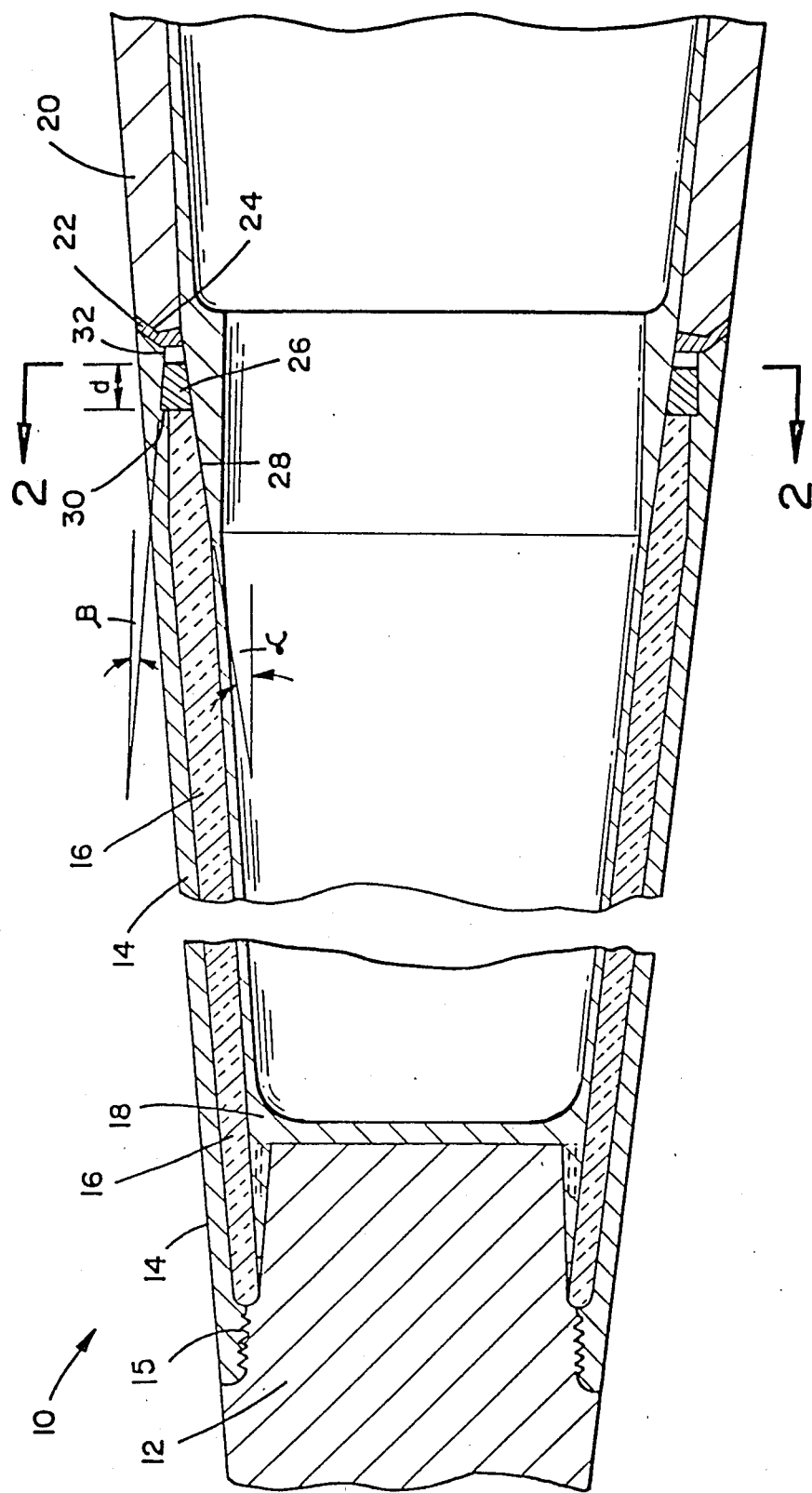
FIG. 1 is a partial cross-sectional view of a reentry body illustrating the attachment of a carbon-carbon forward heatshield between a carbon-carbon nosetip and a carbon-phenolic aft heatshield.

Referring now to the drawings and, in particular to FIG. 1, the ballistic reentry body 10 includes a shape-stable conical nosetip 12 of carbon-carbon composite material. To protect the forebody structure of the reentry body, a conical forward heatshield 14 of carbon-carbon composite material is anchored to the nosetip 12 by threads 15. Since the nosetip 12 and the forward heatshield 14 have similar thermal expansion characteristics, the nosetip provides rigid structural support for the small end of the conical heatshield 14 at all conditions of thermal expansion. The thread type and tolerance are selected to minimize the thermal gradient across the joint and thereby limit differential radial growth and maintain thread efficiency. The length of the thread is chosen to provide sufficient shear resistance to the axial load path.

A high-temperature, compliant, carbonaceous conical insulator 16 is disposed between a conical aluminum substructure 18 and the forward heatshield 14 to reduce heat transfer during reentry because of the high thermal conductivity of carbon-carbon materials. The insulator 16 allows the use of a low-temperature material such as aluminum for substructure 18 rather than a substructure of more costly high-temperature material such as beryllium. The thickness of the carbon-carbon heatshield is sized to bear all transverse loading in order to allow the insulator to function as a thermal barrier only. The insulator requires a material having a high temperature capability, a low thermal conductivity, a positive radial thermal expansion over the expected temperature range, and an adequate compression strength for handling and assembly. A vacuum cast insulator made from a rayon fiber-phenolic binder slurry is a preferred construction.

The aft end of the reentry body 10 is protected by a conical aft heatshield 20 of carbon-phenolic composite material. Because of the large thermal expansion experienced by the carbon-carbon forward heatshield 14, the interface between the forward heatshield and the aft heatshield 20 must permit large axial and radial thermal expansion and also provide rigid radial structural support for the conical forward heat shield at all times.

The aft joint between the forward heatshield and the aft heatshield provides the proper support while allowing thermal expansion during reentry. The aft joint includes a tolerance gap between the forward heatshield 14 and the aft heatshield 20 which is sized to provide for the thermal expansion of the forward heatshield. The gap is filled with a high temperature insulating spacer washer 22 of frangible material such as grafoil or a compressible carbon paper laminate. The washer 22 fills the gap and protects the metallic substructure 18 from the high temperature. This washer 22 crumbles and is evacuated by the slip stream as it is crushed by the axial expansion of the forward heatshield 14. The forward end of the aft heatshield and the aft end of the forward heatshield 14 are tapered at the interface gap to provide a ramp 24 tailored to accommodate the vector movement of the carbon-carbon heatshield 14 due to the axial and circumferential thermal expansion.

Support for the forward heatshield 14 is provided by a segmented ring of wedge blocks 26 of pyrolytic graphite in cooperation with a conical inclined plane 28 provided by the metallic substructure 18. The wedge ring 26 provides the necessary load path between the carbon-carbon heatshield 14 and the metallic substructure 18. The wedge ring 26 is disposed against an annular shoulder 30 of the forward heatshield 14 and between the inclined surface 28 of the substructure 18 and an inclined surface 32 of the forward heatshield. The angle, alpha, of the substrate inclined surface 28 is chosen to accommodate the range of expected movements and the angle, beta, of the forward heatshield inclined surface 32 is chosen to provide the axial relation necessary to ensure proper ramp descent during the heatshield cooldown phase. The width d of the wedge blocks 26 is sized to limit the bearing stress between the heatshield 14 and the wedged blocks.

Pyrolytic graphite has high thermal expansion (similar to that of carbon-carbon) in one plane and good insulating characteristics in the cross plane. By placing the graphite wedge blocks 26 with the high thermal expansion planes oriented in the axial and circumferential directions of the reentry body 10, the wedge blocks will expand with the carbon-carbon heatshield 14 and provide continuous support during all phases of flight. In this orientation, the insulator planes of the wedge blocks 26 are oriented in the radial direction of the reentry body. The insulator planes of the wedge blocks 26 thus provide insulation to adequately reduce the heat transfer through the aft end of the carbon-carbon heatshield 14 to the substructure 18.

FIGS. 2 and 3 illustrate that the segmented ring of blocks may consist of a just few segments or many segments. Of course, the wedge ring 26 must include gaps 34 of sufficient size between the segments to allow for the circumferential thermal expansion of the pyrolytic graphite blocks during reentry. The gaps 34 are shown in FIGS. 2 and 3 but are not visible as gaps in FIG. 3 because of the scale of the drawing.

Obviously, many modifications and variations of the present invention are possible in light of the above teachings. It is therefore to be understood that within the scope of the appended claims, the invention may be practiced otherwise than as described.

What is claimed and desired to be secured by Letters Patent of the United States is:

1. In a reentry body of the type having a nosetip of carbon-carbon composite material, a conical forward heatshield of carbon-carbon composite material having its forward end coupled to said nosetip, a conical aft heatshield of carbon-phenolic composite material having its forward end coupled to the aft end of the forward heatshield, and a metallic substructure disposed interior to said forward and aft heatshields, the improvement being means for coupling said forward heatshield to said aft heatshield which provides continuous support for said heatshields while allowing large axial and circumferential expansion of said forward heatshield, which comprises:

(a) said forward heatshield and said aft heatshield being disposed to provide a tolerance gap between said forward heatshield and said aft heatshield, said tolerance gap being sized to accomodate thermal expansion of the forward heatshield;

(b) a spacer washer of high temperature material disposed in said tolerance gap, said washer accomodating the thermal expansion of the forward heatshield; and (c) a segmented ring of wedge blocks of pyrolytic graphite disposed between an inclined surface of said substructure and an inclined surface of the forward heatshield, the inclined surface of said substructure accomodating thermal expansion of said wedge blocks and movements of said wedge blocks due to thermal expansion of the forward heatshield, said segmented ring including gaps between the segments to allow for circumferential thermal expansion of the wedge blocks.

2. A means for coupling as recited in claim 1 wherein said wedge blocks of pyrolytic graphite are oriented with high thermal expansion planes in the axial and circumferential directions of the reentry body.

3. A means for coupling as recited in claim 1 wherein said wedge blocks of pyrolytic graphite are oriented with insulating planes oriented in the radial direction of the reentry body.

4. A means for coupling as recited in claim 2 wherein said spacer washer is of a frangible, high temperature material.

5. A means for coupling as recited in claim 2 wherein said spacer washer is of a compressible high temperature material.

6. A means for coupling as recited in claim 2 wherein said forward heatshield and said aft heatshield are tapered at said tolerance gap to provide a ramp which accomodates vector movement of the forward heatshield due to thermal expansion.

7. A means for coupling as recited in claim 6 wherein said forward heatshield has an annular shoulder forward of said inclined surface, said segmented ring of wedge blocks being disposed against said annular shoulder and between the inclined surface of the substructure and the inclined surface of the forward heatshield.

8. A means for coupling as recited in claim 7 wherein the inclined surface of said forward heatshield is inclined at an angle chosen to provide an axial ramp to ensure descent of said wedge blocks during cooldown of said heatshield following thermal expansion.

9. In a reentry body of the type having a nosetip made from a material having a first thermal expansion characteristic, a conical forward heatshield having a thermal expansion characteristic similar to said nosetip and attached to said nosetip, a conical aft heatshield coupled to said conical forward heatshield, said aft heatshield having a second thermal expansion characteristic which provides less expansion per unit increase in temperature than said first thermal expansion characteristic, and a metallic substructure disposed interior to said forward and aft heatshields, the forward heat shield experiencing greater heating during flight and undergoing greater thermal expansion in the axial and circumferential directions than said aft heatshield during flight, the improvement being means for coupling said forward heatshield to said aft heatshield which provides continuous support for said forward heatshield while allowing axial and circumferential expansion of said forward heatshield, which comprises:

(a) said forward heatshield and said aft heatshield being disposed to provide a tolerance gap between said forward heatshield and said aft heatshield, said tolerance gap being sized to accomodate thermal expansion of the forward heatshield;

(b) a spacer washer of high temperature which disposed in said tolerance gap, said washer accomodating the thermal expansion of the forward heatshield; and (c) a segmented ring of wedge blocks disposed between an inclined surface of said substructure and an inclined surface of the forward heatshield, the inclined surface of said substructure accomodating thermal expansion of said wedge blocks and movements of said wedge blocks due to thermal expansion of the forward heatshield, said segmented ring including gaps between the segments to allow for circumferential thermal expansion of the wedge blocks.

10. means for coupling as recited in claim 3 wherein said wedge blocks are of a material having an axial and circumferential expansion characteristic similar to the material of said forward heatshield.

11. A means for coupling as recited in claim 10 wherein said spacer washer is of a frangible, high temperature material.

12. A means for coupling as recited in claim 10 wherein said spacer washer is of a compressible high temperature material.

13. A means for coupling as recited in claim 10 wherein said forward heatshield and said aft heatshield are tapered at said tolerance gap to provide a ramp which accomodates vector movement of the forward heatshield due to thermal expansion.

14. A means for coupling as recited in claim 13 wherein said forward heatshield has an annular shoulder forward of said inclined surface, said segmented ring of wedge blocks being disposed against said annular shoulder and between the inclined surface of the substructure and the inclined surface of the forward heatshield.

15. A means for coupling as recited in claim 14 wherein the inclined surface of said forward heatshield is inclined at an angle chosen to provide an axial ramp to ensure descent of said wedge blocks during cooldown of said heatshield following thermal expansion.

16. A means for coupling as recited in claim 10 wherein said forward heatshield is of carbon-carbon composite material.

17. A means for coupling as recited in claim 16 wherein said wedge blocks are of pyrolytic graphite.

18. A heatshield/nose tip structure for a reentry body comprising:

(a) a nose tip of carbon-carbon composite material;

(b) a conical forward heatshield of carbon-carbon composite material, said conical forward heat shield being coupled to said nose tip by a threaded connection;

(c) a conical aft heatshield of carbon-phenolic material, said conical aft heatshield being coupled to said forward heatshield;

(d) a conical substructure disposed interior to said forward heatshield and said aft heatshield; and (d) means for coupling said forward heatshield to said aft heatshield which provides continuous support for said heatshields while allowing large axial and circumferential expansion of said forward heatshields including said forward heatshield and said aft heatshield being disposed to provide a tolerance gap between said forward heatshield and said aft heat shield, said tolerance gap being sized to accomodate thermal expansion of the forward heatshield;

a spacer washer of high temperature material disposed in said tolerance gap, said washer accomodating the thermal expansion of the forward heatshield; and a segmented ring of wedge blocks of pyrolytic graphite disposed between an inclined surface of said substructure and an inclined surface of the forward heatshield, the inclined surface of said substructure accoomodating thermal expansion of said wedge blocks and movements of said wedge blocks due to thermal expansion of the forward heatshield, said segmented ring including gaps between the segments to allow for circumferential thermal expansion of the wedge blocks.

19. A heatshield/nose tip structure as recited in claim 18 wherein said wedge blocks of pyrolytic graphite are oriented with high thermal expansion planes in the axial and circumferential directions of the reentry body and with insulating planes oriented in the radial direction of the reentry body.

20. A heatshield/nose tip structure as recited in claim 19 wherein said spacer washer is of a frangible, high temperature material.

21. A heatshield/nose tip structure as recited in claim 19 wherein said spacer washer is of a compressible high temperature material.

22. A heatshield/nosetip structure as recited in claim 19 wherein said forward heatshield and said aft heatshield are tapered at said tolerance gap to provide a ramp which accomodates vector movement of the forward heatshield due to thermal expansion.

23. A heatshield/nose tip structure as recited in claim 22 wherein said forward heatshield has an annular shoulder forward of said inclined surface, said segmented ring of wedge blocks being disposed against said annular shoulder and between the inclined surface of the substructure and the inclined surface of the forward heatshield.

24. A heatshield/nose tip structure as recited in claim 23 wherein the inclined surface of said forward heatshield is inclined at an angle chosen to provide an axial ramp to ensure descent of said wedge blocks during cooldown of said heatshield following thermal expansion.

25. A heat shield/nose tip structure as recited in claim 19 further including a high-temperature, compliant carbonaceous conical insulator disposed between said substructure and said forward heatshield.

* * * * *